(12) United States Patent
Isaacson

(10) Patent No.: US 9,191,285 B1
(45) Date of Patent: Nov. 17, 2015

(54) AUTOMATIC WEB SERVICE MONITORING

(71) Applicant: Domo, Inc., American Fork, UT (US)

(72) Inventor: Derrick Isaacson, Saratoga Springs, UT (US)

(73) Assignee: DOMO, INC., American Fork, UT (US)

( * ) Notice: Subject to any disclaimer, the term of this patent is extended or adjusted under 35 U.S.C. 154(b) by 279 days.

(21) Appl. No.: 13/774,113

(22) Filed: Feb. 22, 2013

Related U.S. Application Data

(60) Provisional application No. 61/610,872, filed on Mar. 14, 2012.

(51) Int. Cl.
*G06F 15/173* (2006.01)
*H04L 12/26* (2006.01)

(52) U.S. Cl.
CPC ...................................... *H04L 43/00* (2013.01)

(58) Field of Classification Search
CPC .................. G06F 17/30861; G06F 17/30887; G06F 9/4443; G06F 3/0482; H04L 67/02; G06Q 10/02; H04M 1/72566; H04M 1/72569
See application file for complete search history.

(56) References Cited

U.S. PATENT DOCUMENTS

| | | | | |
|---|---|---|---|---|
| 6,266,060 B1* | 7/2001 | Roth | | 715/853 |
| 6,353,839 B1* | 3/2002 | King et al. | | 715/236 |
| 6,691,280 B1* | 2/2004 | Dove et al. | | 715/210 |
| 8,527,436 B2* | 9/2013 | Salaka et al. | | 706/13 |
| 2002/0065850 A1* | 5/2002 | Baudu et al. | | 707/513 |
| 2002/0099723 A1* | 7/2002 | Garcia-Chiesa | | 707/200 |
| 2003/0018714 A1* | 1/2003 | Mikhailov et al. | | 709/203 |
| 2006/0074696 A1* | 4/2006 | Sato | | 705/1 |
| 2006/0146879 A1* | 7/2006 | Anthias et al. | | 370/471 |
| 2006/0253586 A1* | 11/2006 | Woods | | 709/226 |
| 2007/0180020 A1* | 8/2007 | Woods | | 709/203 |
| 2007/0283273 A1* | 12/2007 | Woods | | 715/738 |
| 2009/0055249 A1* | 2/2009 | Lieberman | | 705/10 |
| 2009/0055267 A1* | 2/2009 | Roker | | 705/14 |
| 2009/0089859 A1* | 4/2009 | Cook et al. | | 726/3 |
| 2010/0023582 A1* | 1/2010 | Pedersen et al. | | 709/203 |
| 2012/0054135 A1* | 3/2012 | Salaka et al. | | 706/13 |
| 2012/0311470 A1* | 12/2012 | Roberts et al. | | 715/763 |
| 2013/0254412 A1* | 9/2013 | Menezes et al. | | 709/228 |
| 2014/0095697 A1* | 4/2014 | Killow et al. | | 709/224 |
| 2015/0007312 A1* | 1/2015 | Pidathala et al. | | 726/22 |

* cited by examiner

*Primary Examiner* — Ranodhi Serrao

(57) ABSTRACT

According to various embodiments, the present invention provides live site performance monitoring in the context of logical resource hierarchies found in cloud computing systems. In particular, in one embodiment, the system of the present invention facilitates monitoring of new computing services without necessarily requiring explicit knowledge about such new services. Such services can include, for example and without limitation, those provided using a Representational State Transfer (REST) architecture, although the techniques described herein can also be used with other architectures. In one embodiment, the system of the present invention operates by automatically creating groups of items for performance monitoring, based on the hierarchy of a URI. Heuristics can be used to determine aggregatable hierarchy nodes.

20 Claims, 2 Drawing Sheets

AUTOMATIC WEB SERVICE MONITORING

CROSS-REFERENCE TO RELATED APPLICATION

The present application claims priority from U.S. Provisional Application Ser. No. 61/610,872 for "Automatic Web Service Monitoring", filed Mar. 14, 2012, the disclosure of which is incorporated by reference herein, in its entirety.

FIELD OF THE INVENTION

The present invention relates to performance monitoring of cloud computing systems.

SUMMARY

According to various embodiments, the present invention provides live site performance monitoring in the context of logical resource hierarchies found in cloud computing systems. In particular, in one embodiment, the system of the present invention facilitates monitoring of new computing services without necessarily requiring explicit knowledge about such new services. Such services can include, for example and without limitation, those provided using a Representational State Transfer (REST) architecture, although the techniques described herein can also be used with other architectures.

In one embodiment, the system of the present invention operates by automatically creating groups of items for performance monitoring, based on the hierarchy of a URI. Heuristics can be used to determine aggregatable hierarchy nodes.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Figure 1:
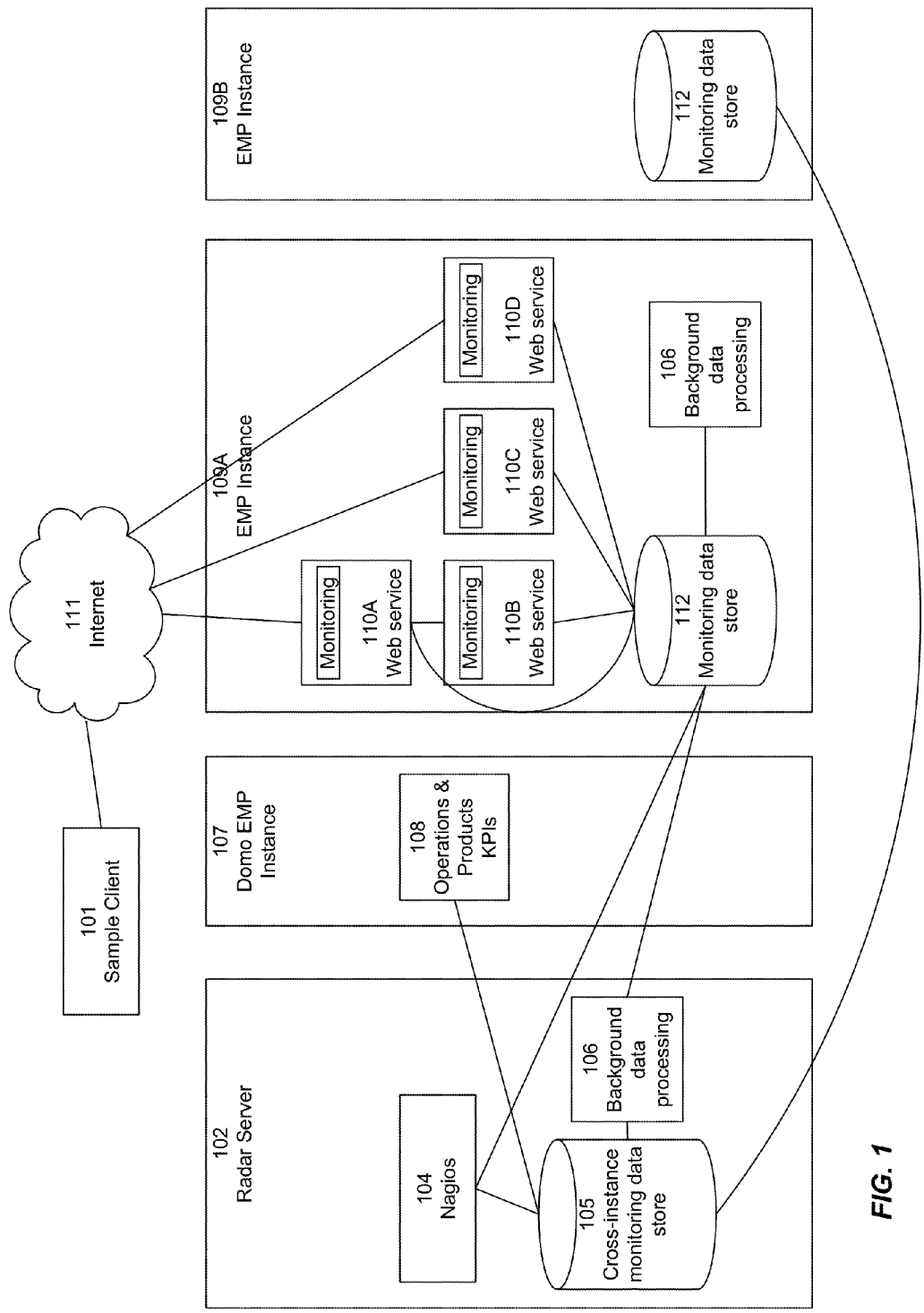
FIG. 1 is a block diagram depicting an architecture for practicing the present invention according to one embodiment.

In one embodiment, the system can be implemented in a client-server architecture. It can be implemented as software written in any suitable computer programming language, such as Java.

In one embodiment, the system of the present invention operates as follows:
  Parse a URI.
  Use heuristics to determine static path elements from dynamic and/or variable elements.
  Create hierarchical monitoring groups based on the static path elements.
  Replace variable path elements with a common value to aggregate monitoring for service requests across multiple resources of the same type.

In one embodiment, the system of the present invention uses a set of expandable heuristics to aggregate statistics across a learned hierarchy of URIs. The system of the present invention thus offers significant advantages over previous systems that do not automatically aggregate across logical hierarchies. For example, some previous systems may use only actual application URIs, without capturing hierarchical relationships between them.

For example, in one embodiment, the system automatically builds a hierarchy of resource monitoring counters that aggregate monitoring statistics for a distributed cloud system. The URIs tracked by the counters may, but need not, conform to some or all of the REST constraints (i.e., they may or may not be "RESTful"). Such constraints are well know in the art and may include, for example:
  Client-server: A uniform interface separates clients from servers.
  Stateless: No client context stored on the server between requests.
  Cacheable: Clients can cache responses. Responses can define themselves as cacheable or not.
  Layered system: A client cannot ordinarily tell whether it is connected directly to the end server, or to an intermediary along the way. Intermediary servers may improve system scalability by enabling load-balancing and by providing shared caches. They may also enforce security policies.
  Code on demand: Servers are able temporarily to extend or customize the functionality of a client by the transfer of executable code. Examples of this may include compiled components such as Java applets and client-side scripts such as JavaScript.
  Uniform interface: A uniform interface is provided between clients and servers, to simplify and decouple the architecture, and to enable each part to evolve independently.

In one embodiment, the Automatic Web Service Monitor of the present invention uses a service-agnostic request filter to automatically monitor performance statistics for any HTTP service. The filter gathers any or all of: request counts, average latencies, 99th percentile latencies, response status code counts, and the like.

In one embodiment, the filter uses an extensible set of heuristics to automatically identify hierarchies in the URIs, and aggregates statistics for each node in the hierarchy. These heuristics identify path elements which are likely variables in a service handler. These path elements are then replaced with "{id}" in the URI. This modified URI is used to match elements with other requests, and to aggregate their statistics.

The filter also parses the URI at path separators, the slash ("/") character, and builds a URI tree. Each node in the tree tracks statistics that are an aggregate of requests for that URI, and any descendants in the tree. The filter aggregates these statistics for a configured period, saves the statistics to a persistent storage device such as a database, clears the counters, and repeats the process.

In one embodiment, the filter, though a background thread, periodically stores data points in persistent storage. Such persistent storage can be, for example, a Mongo database, though any of a variety of database technologies can be used. A background processing job further aggregates the statistics across both of the two dimensions used: time and resource hierarchy.

The above-described system thus achieves an automatic hierarchical resource monitoring system for cloud resources using URIs for identifiers and HTTP for an application protocol.

Figure 2:
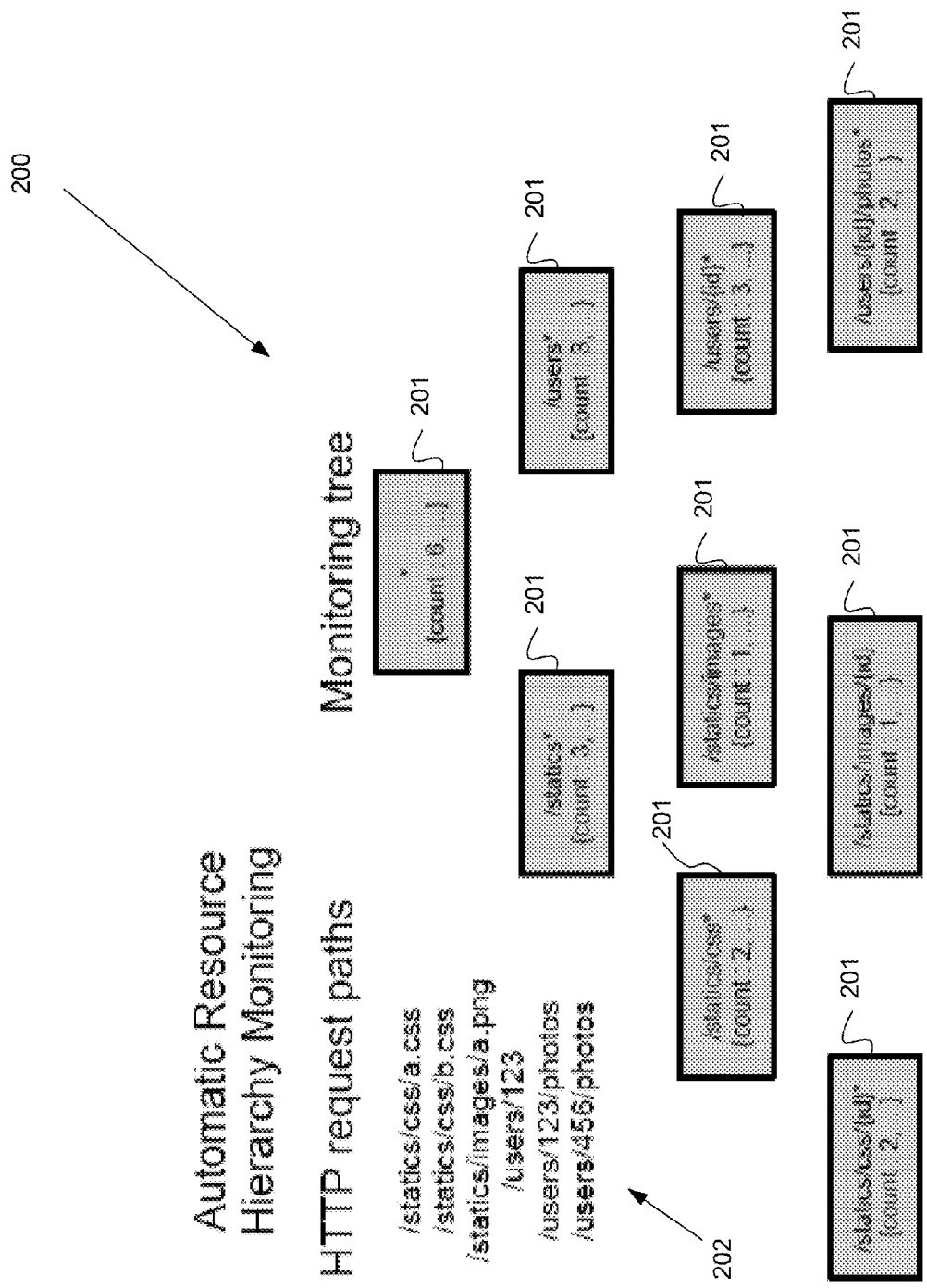
FIG. 2 is a block diagram depicting an example of a resource hierarchy that can be automatically inferred and monitored by the system of the present invention according to one embodiment.

Referring now to FIG. 2, there is shown an example of a resource hierarchy 200 that can be automatically inferred and monitored by the system of the present invention. Hierarchy 200 is presented as a monitoring tree containing a plurality of nodes 201. Each node 201 corresponds to an HTTP request path, as shown in list 202. In at least one embodiment, the system of the present invention is able to automatically infer the depicted hierarchical relationship among nodes 201, as represented by their positioning in FIG. 2 and by the request paths.

Referring now to FIG. 1, there is shown a block diagram depicting an architecture for practicing the present invention according to one embodiment. In this embodiment, the techniques of the present invention are used in connection with performance monitoring and alerting for a cloud-based application referred to as Executive Management Platform (EMP). Such an architecture can include data collection (monitoring) components, analysis tools, and alerting mechanisms. In one embodiment, system monitoring is provided by multiple components (web services 110A through 110D) running on an EMP instance 109A and/or 109B; data is stored at data store 112. Data is transferred to cross-instance monitoring data store 105. In at least one embodiment, at least one EMP instance (referred to as a Domo EMP instance 107) generates Key Performance Indicators (KPIs) 108 from data in cross-instance monitoring data store 105.

Machine statistics such as ICMP responsiveness and CPU utilization are monitored. Application monitoring is provided, for example, by the service-agnostic request filter described above, which may be used system-wide to capture detailed and aggregated request statistics. Such monitoring may take place, for example, in connection with data requests and responses from/to a client 101, which take place over the Internet 111 or some other electronic network.

In one embodiment, the filter relies on a reusable monitoring component for data capturing. This "Counter" component can be used for deep, flexible, business and system insight. The Counter component can be used to measure various statistics regarding web server resources, such as: which are used most often, which take the longest to return, and additional analysis of aggregate resource access statistics. Resources can be organized by service type, so that analyses across time and service hierarchies can be provided.

In one embodiment, the architecture for implementing the present invention includes data and tools to facilitate data-driven decisions in live site monitoring, system design, system optimization, system resource allocation, and more. In one embodiment the architecture employs monitoring technology such as Nagios XI 104, available from Nagios Enterprises, LLC of Saint Paul, Minn., to monitor a variety of machine and application properties, and to alert when such properties reach or cross predefined thresholds. One skilled in the art will recognize, however, that any suitable monitoring software can be used. Nagios XI 104 (or another monitoring system) runs on a server 102 referred to herein as "Radar server", or at any other suitable location.

In at least one embodiment, the techniques of the present invention are performed as part of background data processing 106 that runs in connection with data store 112 and/or data store 105.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for automatically monitoring a web service, comprising:
    intercepting an incoming request directed to the web service at a computing device comprising a processor and memory, the intercepted request comprising a uniform resource identifier (URI) that comprises one or more static path elements and one or more dynamic elements;
    associating the intercepted request with one of a plurality of monitoring groups, wherein the monitoring groups are embodied as entries in a data structure maintained on a non-transitory storage device such that each entry corresponds to a resource of the web service, wherein the entries comprise respective counters comprising performance statistics pertaining to requests directed to the resource of the entry, and wherein associating the intercepted request with a hierarchical monitoring group comprises:
        forming a modified URI for the incoming request in the memory of the computing device using the processor, wherein forming the modified URI comprises replacing a dynamic element of the incoming request URI with a common value using the processor,
        matching the modified URI in the memory of the computing device to a web resource corresponding to one of the entries of the data structure using the processor, and
        associating the incoming request with the hierarchical monitoring group of the matching web resource,
    gathering performance statistics pertaining to a response generated by the web service to the incoming request at the computing device; and
    updating the counter of the entry associated with the incoming request in response to gathering the performance statistics.

2. The computer-implemented method of claim 1, wherein the web service provides resources at respective resource paths, and wherein each entry in the data structure comprises a path identifier that corresponds to one or more of the resource paths, the method further comprising:
    establishing a path identifier for a particular entry corresponding to a resource path of the web service by including a common value in the resource path to represent a dynamic element in a URI of an incoming request; and
    matching the particular entry to the modified URI of the incoming request by comparing the modified URI to the path identifier of the particular entry.

3. The computer-implemented method of claim 2, wherein establishing the path identifier for the particular entry comprises inserting the common value between two or more static path elements of the resource path.

4. The computer-implemented method of claim 1, wherein the resources of the web service comprise respective hierarchical resource paths, the method further comprising:
    maintaining the entries of the respective monitoring groups in a hierarchical tree data structure on the non-transitory storage device, such that each entry corresponds to a respective hierarchical resource path of the web service; and establishing hierarchical relationships between the entries in the hierarchical tree data structure that correspond to the hierarchical resource paths of the respective entries.

5. The computer-implemented method of claim 4, further comprising:

forming a path identifier for a particular entry in the hierarchical tree data structure, the particular entry corresponding to a hierarchical resource path that comprises a plurality of static path elements by inserting a common value into the path identifier to represent dynamic elements of a URI directed to the corresponding resource of the web service; and matching the particular entry to the modified URI of the incoming request by comparing the modified URI of the incoming request to the path identifier of the particular entry.

6. The computer-implemented method of claim 4, further comprising aggregating performance statistics of a plurality of entries based on hierarchical relationships between the entries in the hierarchical tree data structure.

7. The computer-implemented method of claim 6, wherein aggregating the performance statistics comprises combining performance statistics of a selected entry of the hierarchical tree data structure and one or more child entries of the selected entry in the hierarchical tree data structure.

8. The computer-implemented method of claim 1, further comprising:

creating a new entry on the non-volatile storage medium in response to determining that the modified URI of the incoming request does not match web resources of any of the entries in the data structure; and associating the incoming request with the new entry.

9. The computer-implemented method of claim 1, further comprising establishing entries of a monitoring tree data structure on the non-transitory storage device in response to intercepting requests directed to the web service such that the entries correspond to respective hierarchical resource paths, and hierarchical relationships between the entries correspond to hierarchical relationships of the respective resource paths.

10. A system, comprising:

a monitoring data store comprising a non-transitory storage medium storing a tree data structure comprising a plurality of tree nodes, wherein each of the tree nodes comprises a) a resource path identifier corresponding to a resource of a web service, b) monitoring statistics pertaining to the respective resource;

a computing device comprising a processor and network interface, computing device comprising a request filter configured for execution on the processor, wherein the request filter is configured to track monitoring statistics pertaining to the respective resources of the web service by use of the tree data structure, and wherein the request filter is further configured to;

monitor incoming requests directed to the web service received through a network, generate modified resource identifiers corresponding to the incoming requests, wherein the modified resource identifier of an incoming request replaces a variable embedded within a resource identifier of the incoming request with a common value, correlate the incoming requests with respective tree nodes by comparing the modified resource identifiers of the incoming requests to the resource path identifiers of the tree nodes, capture metrics pertaining to the respective incoming requests, wherein the captured metrics of an incoming request comprise metrics related to a response generated by the web service to the incoming request, and update the monitoring statistics of the tree nodes that are correlated to the respective incoming requests on the monitoring data store based on the captured metrics pertaining to the respective incoming requests.

11. The system of claim 10, wherein the resource path identifier for the resource of a particular tree node comprises a plurality of static path elements and a common value to represent a variable, and wherein the request filter is configured to correlate an incoming request to the particular tree node by matching the static path elements and the common value of the resource path identifier to static path elements and a common value of the modified resource identifier of the incoming request.

12. The system of claim 11, wherein the tree nodes are arranged in the tree data structure according to hierarchical relationships between resource path identifiers of the respective tree nodes.

13. The system of claim 12, wherein the resource path identifiers of the tree nodes comprise a hierarchy of one or more path elements, and wherein the hierarchical relationships between the tree nodes corresponds to the hierarchy of the one or more path elements of the respective tree nodes.

14. The system of claim 13, wherein hierarchy of one or more path elements of a particular tree node comprises one or more static path elements and one or more common values, wherein the common values are configured to represent variables embedded within resource identifiers of requests directed to the web service resource corresponding to the particular tree node.

15. The system of claim 13, wherein the request filter is configured to automatically identify hierarchical relationships between the tree nodes by parsing resource identifiers of the incoming requests, wherein the request filter is configured to add a new tree node to the tree data structure in response to monitoring an incoming request having a modified resource identifier that does not correlate to a resource path of any of the tree nodes.

16. A non-transitory computer-readable storage medium comprising executable instructions configured to cause a computing device to perform operations, the operations comprising:

filtering incoming Hypertext Transfer Protocol (HTTP) requests directed to a web server, each incoming HTTP request comprising a uniform resource locator (URL) to reference a resource of the web server;

accessing a monitoring tree data structure stored on non-volatile storage medium, the monitoring tree comprising nodes that correspond to respective resources of the web server, each node comprising a resource path identifier corresponding to a resource of the web server and a set of monitoring statistics;

aggregating monitoring statistics pertaining to the incoming HTTP requests within the monitoring tree data structure, wherein aggregating monitoring statistics for an incoming HTTP request comprises;

deriving a modified resource identifier from the URL of the incoming HTTP request by replacing dynamic path elements of the URL with a common value, searching the monitoring tree to identify a node that comprises a resource path identifier that matches the modified resource identifier of the incoming HTTP request, acquiring monitoring statistics corresponding to a response generated by the web server servicing to the incoming HTTP request, and updating monitoring statistics of the identified node with the acquired monitoring statistics.

17. The non-transitory computer-readable storage medium of claim 16, wherein the monitoring statistics of a node comprise one or more of a request count, an average latency, a 99th percentile latency, and a response status code count.

18. The non-transitory computer-readable storage medium of claim 16, further comprising inferring hierarchical relationships between nodes in the tree data structure based on a resource hierarchy of the respective resource path identifiers of the nodes.

19. The non-transitory computer-readable storage medium of claim 17, further comprising combining monitoring statistics of a plurality of nodes based on the inferred hierarchical relationships between the plurality of nodes.

20. The non-transitory computer-readable storage medium of claim 17, wherein deriving the modified resource identifier further comprises parsing the URL of the incoming HTTP request to distinguish the static path elements of the URL from the dynamic path element.

* * * * *